3,275,703
PROCESS FOR ALKYLATION OF AROMATIC HYDROCARBONS

Alan K. Roebuck, Schererville, Ind., and Bernard L. Evering, Chicago, Ill., assignors to Standard Oil Company, Chicago, Ill., a corporation of Indiana
No Drawing. Filed Jan. 24, 1964, Ser. No. 339,859
13 Claims. (Cl. 260—671)

This invention relates to the alkylation of aromatics, and particularly relates to the preparation of tertiary alkyl-substituted mono-nuclear aromatic ring compounds using an aluminum halide-ether catalyst system.

It has been known for some time to use Friedel-Crafts type catalysts to alkylate aromatics. When a mono-alkyl aromatic compound is alkylated with a tertiary alkylating agent, the catalyst system has a strong effect on whether the alkylation will occur primarily at the meta- or the para-position. When alkylating aromatics using active Friedel-Crafts catalysts, such as $AlCl_3$ or $AlBr_3$, the reaction product is predominantly the meta isomer; see M. J. Schlotter and R. D. Clark's note titled "Orientation of t-Alkylation Products of Toluene and Ethylbenzene," Journal of the American Chemical Society, 75, 361 (1953), and also C. C. Price's chapter 1 in "Organic Reactions," volume 3 (1946), at pages 8–9. Such is true when the catalyst system is an excess of an aluminum halide dissolved in an aluminum halide-ether complex.

However, we have now discovered a means of preferentially directing to the para-position the alkylation of a mono-nuclear aromatic ring with a tertiary alkylating agent when using an aluminum halide-ether complex catalyst system. To accomplish this, we add to the system as a catalyst modifier one mol of a sodium, cuprous and/or silver halide per mol of excess aluminum halide dissolved in the aluminum halide-ether complex. The halides of the catalyst system and the modifiers are preferably the same, selected from the chlorides, bromides or iodides.

The aromatic compounds suitable for alkylation in our process are those having a mono-nuclear aromatic ring having an open (that is, non-substituted) para-position. Such aromatics include benzene, toluene, ethylbenzene, cumene, t-butyl benzene and the like. When benzene is used as a feedstock in this process, most of the reaction product is the mono-tertiary alkyl benzene, with a minority being the di-tertiary alkyl benzenes, but of the latter, the para isomer predominates. To increase the yield of the di-alkylated product, the mono-alkylated product may be separated and again alkylated. With the mono-substituted benzenes, as referred to above, a single tertiary alkylation takes place, and this at the para-position. Complex aromatic compounds possessing at least one mono-nuclear aromatic ring, such as phenyl naphthalene, diphenyl and ortho methyl diphenyl may also be alkylated by the process to obtain preferentially alkylation at the para-position or, as in the case of diphenyl, both para-positions of the mono-nuclear ring.

When alkylating phenyl naphthalenes in this process, considerable alkylation also occurs at the 6 and 7, and in the case of alpha phenyl naphthalene, at the 3 position of the naphthyl group, as well as at the para-position of the phenyl group.

The tertiary alkylating agents suitable for use in the process are the iso-olefins and tertiary-alkyl halides. These compounds may have from 4 to about 12 to 16 carbon atoms per molecule, with the larger molecules being of particular use in preparing detergents or lubricity compounds. As the number of carbon atoms in the tertiary alkylating agent increases, the tertiary character of the agent decreases; hence, the preferred tertiary alkylating agents have from 4 to 8 carbon atoms per molecule.

When a tertiary alkyl halide is used, the halide atom is preferably the same as the halide used in the catalyst system described hereinafter. When alkylating with iso-olefins, the iso-olefin stream may be mixed with normal olefins without reducing significantly the purity of the alkylation product, inasmuch as normal olefins do not alkylate in the process as described herein. It is not necessary that the iso-olefin used as an alkylating agent be a tertiary olefin, because a non-tertiary iso-olefin will be converted by the catalyst system to a tertiary carbonium ion.

The catalyst system used in the process comprises an equal molar complex of an aluminum halide and an ether in which there is dissolved excess or "free" aluminum halide, and a catalyst modifier as described hereinafter. The aluminum halide may be a chloride, bromide or iodide, with the chloride and bromide being preferred. The ether is preferably a di-normal alkyl ether, although it may be a mono- or diphenyl ether. Dimethyl, methylethyl, and diethyl ethers and mixtures thereof are preferred for making the complex portion of the catalyst. The complex may be prepared as disclosed in Evering et al. U.S. Patent No. 3,032,508, or Roebuck et al. U.S. Patents Nos. 2,897,248 and 2,975,223. The amount of excess aluminum halide dissolved into the aluminum halide-ether complex is preferably maximized, illustratively up to the approximately 12 weight percent solubility limit for aluminum chloride in an aluminum chloride-ether complex. The halide-containing complex is hydroscopic, and care should be taken in its preparation and use to exclude it from water and moist air.

The catalyst modifier used in this process to selectively and preferentially direct the alkylation to the para-position of the mono-nuclear aromatic ring is a chloride, bromide or iodide of sodium, copper (valence of 1), or silver. Mixtures of common halides of such modifiers may be used. Sufficient catalyst modifier is added to provide one mol of modifier per mol of excess aluminum halide dissolved in the aluminum halide-ether complex. The specificity of these catalyst modifiers is unexpected in view of the fact that lithium, calcium and plumbous halides, as well as the cuprous and silver halides, have been used effectively as inhibitors in paraffin alkylation processes using an aluminum chloride-ether catalyst systems; see U.S. Patents Nos. 3,014,083, 3,075,028 and 3,076,048. On the other hand, sodium halides are ineffective as inhibitors in such paraffin alkylation processes. However, we have discovered that lithium, potassium and plumbous halides are substantially ineffective as catalyst modifiers to direct to the para-position tertiary alkylating agents, but that sodium halides, as well as cuprous and silver halides, are effective.

In conducting the process, it is desirable to have at least 25 parts by weight of aromatic feedstock per weight excess aluminum halide plus catalyst modifier. Considerably greater amounts, up to about a weight ratio of 200:1 of aromatic feedstock to excess aluminum halide and catalyst modifier may be used. At least one mol of aromatic compound per mol of alkylating agent is necessary, and it is preferable to maintain in the reaction zone a higher ratio, on the order of about 10:1. The alkylation may be conducted under known alkylating conditions, in the range of about 40 to about 150° F., preferably at temperatures in the range of 60–100° F., and a pressure sufficient to maintain a liquid system, but not so great as to prevent the release from the liquid phase of the HCl formed as a by-product of the alkylation. The residence time in the reaction zone should be correlated with the reaction temperature, with shorter residence times being used with the higher temperatures. In batch operations, a suitable criterion for the completion of the reaction is the cessation of the evolution of HCl.

Specific embodiments of the process are disclosed in the following examples in which toluene was alkylated using catalyst systems having various catalyst modifiers. The catalyst complex was made by adding an equal molar mixture of dimethyl ether, methylethyl ether, and diethyl ether to aluminum chloride disposed in refluxing isopentane. A total of one mol of ether per mol of aluminum chloride was added. After all of the ether had been added, the liquid complex was separated from the isopentane, residual isopentane removed under vacuum, and the complex then distilled at 185–194° F. at one milliliter of mercury absolute pressure. Excess aluminum chloride was dissolved in the complex to the extent of 12 weight percent; 3.5 grams of aluminum chloride were used per 20 ml. (about 26 grams) of the complex. The catalyst modifiers in the form of powders were added either with the excess $AlCl_3$ or subsequently thereto.

Results of these examples are recorded in the following table. Unless noted therein, the alkylations were conducted at 60° F. for 0.75 hour at substantially atmospheric pressure. Twenty ml. of the complex to which has been added 3.5 grams of excess aluminum chloride and the indicated amount of catalyst modifier was used as the catalyst system. Four hundred thirty grams of toluene were charged to each run. Forty grams of tertiary-butyl chloride was used in each run except Nos. 1 and 11, in which 45 grams of tertiary-amyl chloride were used. The aromatic and catalyst systems were placed in a glass reactor, and the tertiary-alkyl chloride added with stirring.

The disclosure of the articles, patents and textbooks referred to above are expressly incorporated by reference into this specification.

Having thus described the invention, what is claimed is:

1. An alkylation process which comprises contacting under alkylation conditions an aromatic compound having a mono-nuclear aromatic ring, said ring having an open para-position, and a tertiary alkylating compound in the presence of a catalyst system comprising an aluminum halide-ether complex in which there is dissolved an excess of said aluminum halide and at least about one mol, per mol of said excess of said aluminum halide, of a catalyst modifier selected from the class consisting of a sodium halide, a cuprous halide, a silver halide, and mixtures thereof, wherein said catalyst system consists essentially of a single halide selected from the class consisting of chlorides, bromides and iodides, whereby said mono-nuclear aromatic ring is preferentially alkylated in the para-position.

2. The process of claim 1 wherein said aromatic compound is toluene and the alkylated product is para-tertiary-alkyl toluene.

3. The process of claim 1 wherein said aromatic compound is benzene and the dialkylated product comprises predominantly para-ditertiary-alkyl benzene.

4. The process of claim 1 wherein said aromatic compound comprises a phenyl naphthalene and the alkylation products comprise a para-tertiary-alkyl phenyl tertiary-alkyl-substituted naphthalene.

*Table*

| Run No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Catalyst Modifier | | (1) | NaCl | NaCl | NaCl | NaCl | (2) NaCl | AgCl | (1) CuCl | CuCl | CuCl | LiCl | LiCl | KCl | PbCl[2] |
| Catalyst Modifier, g | | | 0.75 | 1.1 | 1.5 | 3.0 | 1.5 | 3.7 | 2.6 | 3.9 | 2.6 | 1.1 | 2.2 | 2.0 | 7.3 |
| Catalyst Modifier, Mol/Mol | | | 0.5 | 0.75 | 1.0 | 2.0 | 1.0 | 1.0 | 1.0 | 1.5 | 1.0 | 1.0 | 2.0 | 1.0 | 1.0 |
| Products: | | | | | | | | | | | | | | | |
| Alkylate, g | 63 | 59.5 | 62 | 63 | 65 | 63 | 61 | 62 | 63 | 64 | 65 | 63 | 54 | 62 | 61 |
| Alkylate, percent | 98 | 93.6 | 97 | 98 | 98 | 98 | 90 | 97 | 98 | 98 | 98 | 95 | 79 | 96 | 95 |
| Distribution: | | | | | | | | | | | | | | | |
| Percent Meta | 66 | 67 | 66 | 64 | 8 | 9 | 17 | 10 | 12 | 12 | 8 | 68 | 65 | 65 | 66 |
| Percent Para | 34 | 33 | 34 | 36 | 92 | 91 | 83 | 90 | 88 | 88 | 92 | 32 | 35 | 35 | 34 |

[1] Reaction times of one hour.
[2] Reaction temperature of 110° F.

In the table, the amount of catalyst modifier is indicated in mols per mol of excess aluminum chloride. In Run 1, the product designated as "meta" comprised 39% meta t-amyl toluene, and 13%–14% each of 2-methyl, 3-meta tolyl butane and 2-methyl, 3-para tolyl butane.

Runs 1 and 2 illustrate that the meta-isomer predominates when no catalyst modifier is used. Runs 3 through 6 show that substantially a 1:1 mol ratio of catalyst modifier to excess aluminum chloride is desirable, and that doubling the ratio has no significant effect. Run 7 illustrates the effect of increasing the temperature to 110° F. Runs 10 and 11 illustrate that the catalyst modifiers are effective with both tertiarybutyl and tertiaryamyl chlorides. Although the sodium, cuprous and silver halides are effective catalyst modifiers, Runs 12–15 reveal that the lithium, potassium and plumbous halides are substantially ineffective in respect of directing the alkylation to the para-position.

In a similar run, 350 grams of benzene were alkylated with 47 grams of tertiarybutyl chloride for 1 hour at 40° F., using 20 ml. of an equal molar aluminum chloride-ether complex to which had been added 3.5 grams of excess aluminum chloride and 2.6 grams of cuprous chloride. A yield of 60 grams (97%) was obtained of an alkylate having 84% monotertiarybutyl benzene, and 16% of predominantly para-ditertiarybutyl benzene.

5. The process of claim 4 wherein said aromatic compound is 1-phenyl 4-methyl naphthalene.

6. The process of claim 1 wherein said alkylating compound comprises tertiary butyl chloride and said aluminum halide comprises $AlCl_3$.

7. The process of claim 1 wherein said catalyst modifier comprises sodium chloride.

8. The process of claim 1 wherein said catalyst modifier comprises sodium bromide.

9. The process of claim 1 wherein said catalyst modifier comprises cuprous chloride.

10. The process of claim 1 wherein said alkylating compound comprises isobutylene.

11. The process of claim 1 wherein said alkylating compound comprise an isopentylene.

12. The process of claim 1 wherein said halides are chlorides.

13. The process of claim 1 wherein said halides are bromides.

References Cited by the Examiner

UNITED STATES PATENTS 2,477,290  7/1949  Dornte et al. _____ 260—671 X
2,897,248  7/1959  Roebuck et al. ____ 260—671 X DELBERT E. GANTZ, *Primary Examiner.*

C. R. DAVIS, *Assistant Examiner.*